(12) United States Patent
Magee et al.

(10) Patent No.: US 10,698,108 B2
(45) Date of Patent: Jun. 30, 2020

(54) RECEIVE SIGNAL BEAM STEERING AND DETECTOR FOR AN OPTICAL DISTANCE MEASUREMENT SYSTEM

(71) Applicant: TEXAS INSTRUMENTS INCORPORATED, Dallas, TX (US)

(72) Inventors: David P. Magee, Allen, TX (US); Nirmal C. Warke, Saratoga, CA (US); Baher S. Haroun, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 308 days.

(21) Appl. No.: 15/681,468

(22) Filed: Aug. 21, 2017

(65) Prior Publication Data

US 2018/0341020 A1 Nov. 29, 2018

Related U.S. Application Data

(60) Provisional application No. 62/510,784, filed on May 25, 2017.

(51) Int. Cl.

| G01C 3/08 | (2006.01) |
|---|---|
| G01S 17/10 | (2020.01) |
| G01S 17/42 | (2006.01) |
| G01S 17/26 | (2020.01) |
| G01S 7/484 | (2006.01) |
| G01S 7/4863 | (2020.01) |
| G01S 7/4865 | (2020.01) |

(52) U.S. Cl.
CPC ............ *G01S 17/10* (2013.01); *G01S 7/484* (2013.01); *G01S 7/4863* (2013.01); *G01S 7/4865* (2013.01); *G01S 17/26* (2020.01); *G01S 17/42* (2013.01)

(58) Field of Classification Search
CPC ...... G01S 7/484; G01S 7/4863; G01S 7/4865; G01S 17/42; G01S 17/10; G01S 17/102
USPC ........................................................ 356/5.01
See application file for complete search history.

(56) References Cited

U.S. PATENT DOCUMENTS

| 5,006,721 A | 4/1991 | Cameron et al. |
| 10,191,156 B2* | 1/2019 | Steinberg ............... G01S 7/497 |
| 2006/0197936 A1 | 9/2006 | Liebman et al. |
| 2015/0378023 A1* | 12/2015 | Royo Royo .......... G01S 7/4817 356/5.01 |
| 2016/0266242 A1 | 9/2016 | Gilliland et al. |
| 2017/0276789 A1* | 9/2017 | Ikeno .................... G01S 17/08 |

(Continued)

OTHER PUBLICATIONS

International Search Report for PCT/US2018/034156 dated Sep. 13, 2018.

*Primary Examiner* — Mark Hellner
(74) *Attorney, Agent, or Firm* — Michael A. Davis, Jr.; Charles A. Brill; Frank D. Cimino (57) ABSTRACT

An optical distance measuring system includes a transmitter and a receiver. The transmitter is configured to generate a first optical waveform and direct the first optical waveform toward a first scan point within a field of view (FOV). The receiver is configured to receive the first optical waveform reflected off a first object within the FOV, direct the first optical waveform reflected off the first object to a first photodiode group of an array of photodiode elements, and determine a distance to the first object based on a time of flight of the first optical waveform from the transmitter to the first object and back to the receiver.

17 Claims, 4 Drawing Sheets

(56) References Cited

U.S. PATENT DOCUMENTS

2018/0059248 A1* 3/2018 O'Keeffe ............... G01S 7/4817
2018/0081040 A1* 3/2018 Kubota ................ G01S 7/4863

* cited by examiner

RECEIVE SIGNAL BEAM STEERING AND DETECTOR FOR AN OPTICAL DISTANCE MEASUREMENT SYSTEM

CROSS-REFERENCE TO RELATED APPLICATIONS

The present application claims priority to U.S. Provisional Patent Application No. 62/510,784, filed May 25, 2017, titled "Scanning LiDAR Based on Rx Beam Steering and SiPM Array," which is hereby incorporated herein by reference in its entirety.

BACKGROUND

Optical time of flight systems generally use optical light signals to measure distances to objects based on the time of flight of the light signal to the object and back to the system. For example, Light Detection and Ranging (LiDAR, LIDAR, lidar, LADAR) is an optical time of flight system that measures the distance to one or more objects by reflecting a laser light (a single narrow pulse, sequence of modulated narrow pulses, and/or one or more continuous waveforms) off of the one or more objects and analyzing the reflected light. More specifically, LiDAR systems typically determine a time of flight (TOF) for the laser signal to travel from the laser to an object and return back to the system by analyzing either the correlation or the phase shift between the reflected light signal and the transmitted light signal. The distance to the object may then be determined based on the TOF. These systems may be used in many applications including: geography, geology, geomorphology, seismology, transportation, and remote sensing. For example, in transportation, automobiles may include LiDAR systems to monitor the distance between the vehicle and other objects (e.g., another vehicle). The vehicle may utilize the distance determined by the LiDAR system to, for example, determine whether the other object, such as another vehicle, is too close, and automatically apply braking.

Many LiDAR systems use a rotating optical measurement system to determine distance information for objects in its field of view (FOV). The intensity of the reflected light is measured for several scan points within the FOV and across several vertical planes through a full 360 degree rotation to generate a point cloud image.

SUMMARY

In accordance with at least one embodiment of the disclosure, an optical distance measuring system includes a transmitter and a receiver. The transmitter is configured to generate a first optical waveform and direct the first optical waveform toward a first scan point within a FOV. The receiver is configured to receive the first optical waveform reflected off a first object within the FOV, direct the first optical waveform reflected off the first object to a first photodiode group of an array of photodiode elements, and determine a distance to the first object based on a time of flight of the first optical waveform from the transmitter to the first object and back to the receiver.

Another illustrative embodiment is an optical receiving system for distance measuring that includes a receiver beam steering device, a photodetector, and a processor. The receiver beam steering device is configured to receive a first optical waveform reflected off a first object located at a first scan point within a FOV. The photodetector includes an array of photodiode elements. A first photodiode group of the array of photodiode elements is configured to receive the first optical waveform reflected off the first object from the receiver beam steering device. The processor is configured to determine a distance to the first object based on a time of flight of the first optical waveform from a transmitter to the first object and back to the photodetector.

Yet another illustrative embodiment is a method for determining a distance to an object. The method includes receiving, by a receiver, a first optical waveform reflected off a first object within a FOV. The method also includes directing the first optical waveform reflected off the first object to a first photodiode group of an array of photodiode elements. The method also includes determining a distance to the first object based on a time of flight of the first optical waveform from a transmitter to the first object and back to the receiver.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Optical time of flight systems, such as LiDAR systems (point LiDAR and scanning LiDAR) and three dimensional (3D) TOF cameras, determine distances to various objects utilizing the TOF of an optical signal (e.g., a light signal) to the object and its reflection off the object back to the TOF system (return signal). These systems can be used in many applications including: geography, geology, geomorphology, seismology, transportation, and remote sensing. For example, in transportation, automobiles can include LiDAR systems to monitor the distance between the vehicle and other objects (e.g., another vehicle). The vehicle can utilize the distance determined by the LiDAR system to, for example, determine whether the other object, such as another vehicle, is too close, and automatically apply braking.

Some LiDAR systems scan their field of view (FOV) (e.g., using a rotating optical system or other beam steering method) to determine distance information for objects in its FOV. The intensity of the reflected light is measured for several vertical planes through a full 360 degree rotation. For example, these LiDAR systems can use a rotating set of transmit and receive optics. For each scan plane, a light beam is transmitted and received at each angular position of the rotating system (e.g., a light beam is transmitted to a number of scan points in a grid pattern in the FOV and reflected off objects located at the scan points). When complete, a 3D image of the FOV can be generated.

In conventional systems, the return signal, reflected off of an object at the scan point, is received by a receiver. The light in the return signal is directed towards a single, relatively large area photodiode to collect as much light in the return signal as possible. This large area photodiode converts the return signal into a corresponding current signal (a current that is proportional to the intensity of the received reflected light) which then may be utilized to determine the TOF of the transmitted optical signal, and thus, the distance to the object. However, a single large area photodiode has a relatively high capacitance. Therefore, the use of a single large area photodiode causes reduced bandwidth in the system due to a high capacitance, thus, causing the accuracy of the distance measurements to suffer as signaling edge rates are reduced. Furthermore, the high capacitance of the photodiode causes increased noise in the system, especially at higher frequencies. Hence, there is a need for an optical distance measuring system that includes a receiver that has a photodetector with a relatively lower capacitance.

In accordance with various examples, an optical distance measuring system is provided with a transmitter to transmit optical waveforms that scan the FOV and a receiver to receive return signal optical waveforms. The receiver includes a photodetector that comprises an array of photodiode elements (e.g., PiN diodes, avalanche photo diodes (APDs), single photon avalanche diodes (SPADs), and/or silicon photomultipliers (SiPMs)) that are interconnected so that: the area of each photodiode element is reduced as compared to those found in a single large area photodiode, each of the photodiode elements can be individually selected to contribute to the output current signal of the photodetector, a group of photodiodes (e.g., a 4 by 4 array of individual photodiodes within the overall array of photodiodes) can be individually selected to contribute to the output current signal of the photodetector, and/or the entire array of photodiode elements can be selected to contribute to the output current signal of the photodetector. As the receiver receives the return signal, a beam steering device within the receiver directs the return signal to a small area (a spot) on the photodetector. In some embodiments, the selection of the photodiode elements to contribute to the output current signal of the photodetector is optimized based on the size and location of the return signal spot. Each scan point in the FOV can have a corresponding spot on the photodetector where the beam steering device directs the return signal (e.g., 1 to 1 mapping of scan points to spots on the photodetector that the return signals illuminate). As the optical distance measuring system scans additional scan points, the beam steering device within the receiver directs each return signal to additional locations on the photodetector. In some embodiments, the return signal falls on photodiode elements that overlap the photodiode elements activated for previous return signals. Because only some of the photodiode elements are activated at a time to contribute to the output current signal, overall capacitance and noise in the photodetector are reduced.

Figure 1:
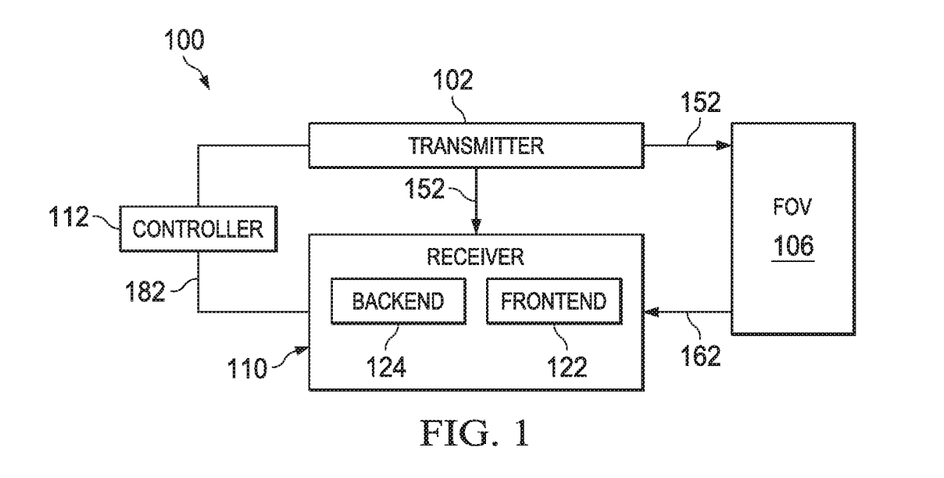
FIG. 1 shows a block diagram of an illustrative optical distance measuring system in accordance with various examples.

FIG. 1 shows an illustrative optical distance measuring system 100 in accordance with various examples. The optical distance measuring system 100 includes a transmitter 102, a receiver 110, and a controller 112. The controller 112 can be implemented as a processor (e.g., a microcontroller, a general-purpose processor, etc.) that executes instructions retrieved from a storage device, or as dedicated hardware circuitry. For example, the controller 112 can be a digital signal processor (DSP), a central processing unit (CPU), a reduced instruction set computing (RISC) core such as an advanced RISC machine (ARM) core, a mixed signal processor (MSP), field programmable gate array (FPGA), etc. The transmitter 102 is configured, in some embodiments by the controller 112, to generate a plurality of optical waveforms 152. In some embodiments, the optical waveforms 152 are single tones (e.g., continuous wave), single tones with phase modulation (e.g., phase shift keying), multiple tones with fixed frequencies (e.g., frequency shift keying), signals with frequency modulation over a frequency range (e.g., chirps), and/or signals with narrowband, pulse position modulation.

More particularly, the transmitter 102, in an embodiment, includes a modulation signal generator, a transmission driver, an optical transmitter (e.g., a laser diode, light emitting diode (LED), etc.), and an optics device (not shown). The modulation signal generator is configured, in an embodiment, to provide a modulation reference signal. The transmit driver generates a drive signal (regulates the current) to control the optical transmitter based on the modulation reference signal. In other words, the modulation reference signal modulates the intensity of the light transmitted by the optical transmitter during the pulse. For example, the transmit driver, in an embodiment, includes one or more power switches that regulate the current to the optical transmitter. The power switches engage at the frequency of the modulation reference signal creating amplitude modulation in the optical waveforms 152.

The optical device, which, in an embodiment is one or more lenses, is configured to direct (e.g., focus) the optical waveforms 152 (e.g., the modulated light signal) toward the FOV 106. In some embodiments, a transmit beam steering device (not shown) may receive the optical waveforms 152 from the transmitter 102 and steer the optical waveforms 152 to the FOV 106. More, particularly, the transmitter 102 and/or the transmit beam steering device directs/steers the optical waveforms 152 to a plurality of scan points. For example, the transmitter 102 and/or the transmit beam steering device (which, in some embodiments, is a solid state device with controllable micromirrors or a phased array, a motorized platform attached to a laser, a rotatable mirror, and/or any other device for beam steering) is configured to direct/steer an optical waveform to a first scan point in the FOV 106 and direct/steer another optical waveform to a second scan point in the FOV 106. In this way, a scan of one or more scan regions, each containing a number of scan points within the FOV 106, is performed.

Each optical waveform 152 can reflect off of an object within the FOV 106 and return toward the receiver 110 as reflected optical waveform 162. Each reflected optical waveform 162 is then received by the receiver frontend 122 which can be controlled by controller 112 through control signal 182. In some embodiments, the receiver frontend 122, in addition to receiving each reflected optical waveform 162 reflected off an object within the FOV 106, is also configured to receive the optical waveforms 152, or a portion of the optical waveforms 152, directly from the transmitter 102. The receiver frontend 122, in an embodiment, is configured to convert the two optical signals into electrical signals (e.g., current signals), a received signal corresponding to the reflected optical waveform 162 and a reference signal corresponding to the optical waveform 152 received directly from the transmitter 102.

The receiver backend 124 utilizes the received signal and the reference signal to determine the distance to objects within the FOV 106 based on the TOF of each optical waveform 152 from the transmitter 102 to the object and back to the receiver 110 as reflected optical waveform 162. For example, the speed of light is known, so the distance to the object is determined and/or estimated using the TOF. That is, the distance is estimated as $$d = \frac{c * TOF}{2}$$

where a is the distance to the object, c is the speed of light, and TOF is the time of flight. The speed of light times the TOF is halved to account for the travel of the light pulse to, and from, the object within the FOV 106. The receiver backend 124 then, in an embodiment, performs a correlation function using the reference signal and the received signal. A peak in the correlation function corresponds to the time delay of each received reflected optical waveform 162 (i.e., the TOF). The distance can then be estimated using the formula discussed above. In other embodiments, a fast Fourier transform (FFT) can be performed on the received signal. A phase of the tone is then used to estimate the delay (i.e., TOF) in the received signal. The distance can then be estimated using the formula discussed above.

As discussed above, multiple optical waveforms 152 may be generated and, each one directed to a different scan point of the scan region within the FOV 106. Thus, distance information of an object at each scan point is determined by the system 100. Therefore, the system 100 can provide a "point cloud image" of the FOV 106 based on distance measurements of the scan region within the FOV 106.

Figure 2:
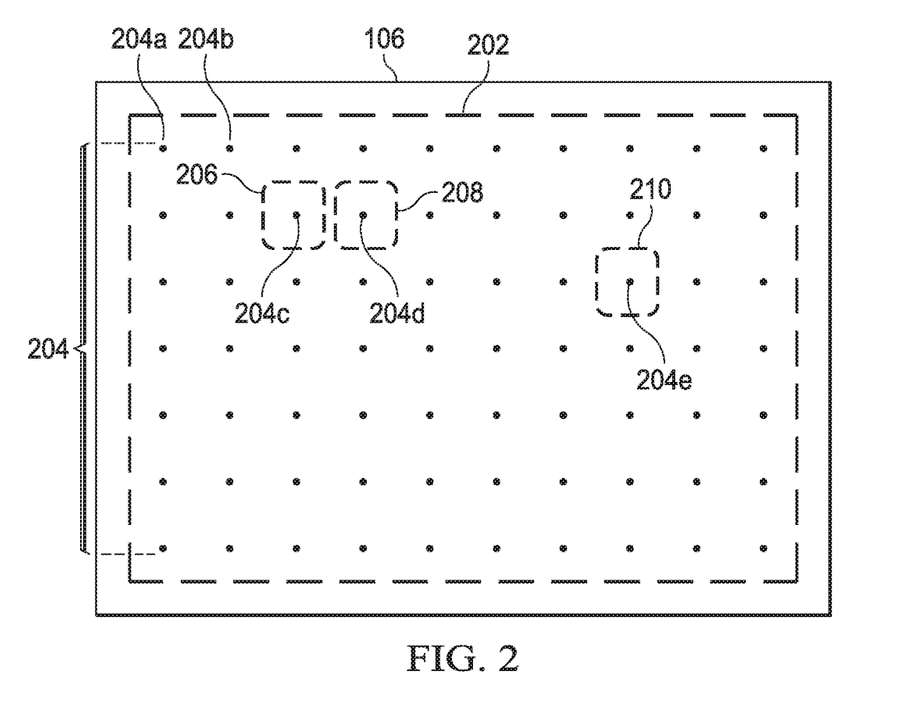
FIG. 2 shows a block diagram of an illustrative scan region within a FOV that is scanned by an optical distance measuring system in accordance with various examples.

FIG. 2 shows an illustrative scan region 202 within FOV 106 that is scanned by an optical distance measuring system 100 in accordance with various examples. In the example shown in FIG. 2, the FOV 106 includes scan region 202. In an embodiment, the scan region 202 is a rectangular uniform scan region that covers the entire, or most of the FOV 106. The scan region 202 includes multiple scan points 204 that cover the entire scan region 202. Thus, in an embodiment, a first optical waveform 152 is directed to scan point 204a, and a distance measurement is made to any object located at scan point 204a. A second optical waveform 152 is directed to scan point 204b, and a distance measurement is made to any object located at scan point 204b. In this way, all of the scan points 204 are scanned. In the example shown in FIG. 2, within the FOV 106 and the scan region 202 are objects 206, 208, and 210. For example, object 206 is located at scan point 204c, object 208 is located at scan point 204d, and object 210 is located at scan point 204e. Each object 206-210 corresponds with a single scan point. Therefore, while each object 206-210 are separate objects, they may be associated with a single entity. For example, objects 206-208 may be separate parts of a single leaf on a tree or locations on a single car adjacent to one another. Through the scanning process discussed above, the distance to each of the objects 206-208 and any other objects within the scan region 202 are determined.

Figure 3:
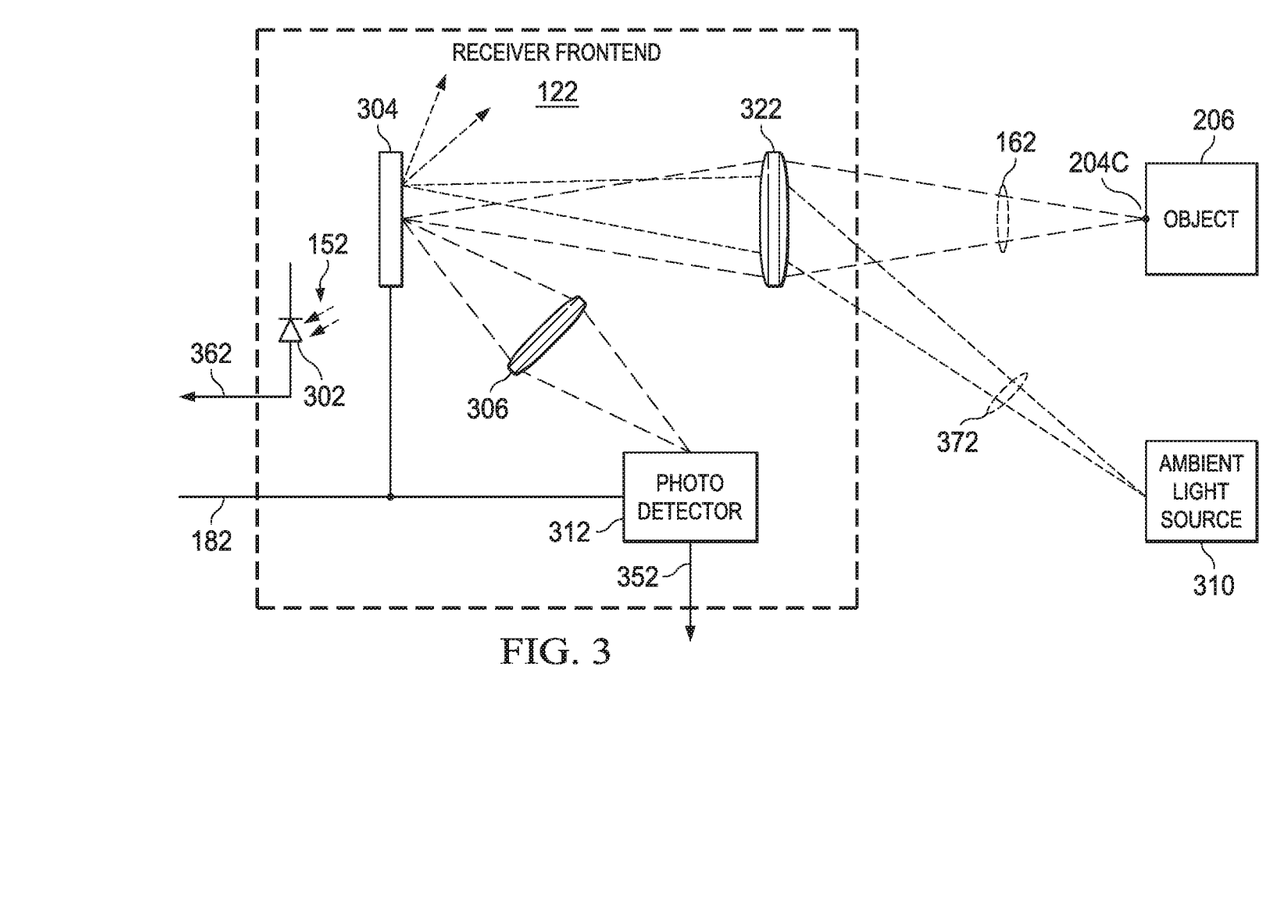
FIG. 3 shows a block diagram of an illustrative receiver frontend for an optical distance measuring system in accordance with various examples.

FIG. 3 shows a block diagram of an illustrative receiver frontend 122 for optical distance measuring system 100 in accordance with various examples. The receiver frontend 122, in an embodiment, includes an optics devices 306 and 322, a receiver beam steering device 304, and photodetectors 302 and 312. As discussed above, in an embodiment, the reflected optical waveform 162 is received by the receiver frontend 122 after reflecting off of an object, such as object 206 at scan point 204c as shown in the example of FIG. 3, within the FOV 106. The optics device 322 (e.g., one or more lenses), in an embodiment, receives the reflected optical waveform 162. The optics device 322 directs (e.g., focuses) the reflected optical waveform 162 onto beam steering device 304.

In some embodiments, the beam steering device 304 is a single chip micromirror device (e.g., a digital micromirror device (DMD)). In the micromirror device embodiments, the beam steering device 304 has a surface that includes thousands, tens of thousands, hundreds of thousands, millions, etc. microscopic mirrors arranged in an array (e.g., a rectangular array). Each of the mirrors on the beam steering device 304 are capable of rotation, in some embodiments, by plus or minus 10 to 12 degrees. In other embodiments, the mirrors of the beam steering device 304 can be rotated by more or less than plus or minus 10 to 12 degrees. In some embodiments, one or more electrodes (e.g., two pairs) control the position (e.g., the amount of rotation) of each mirror by electrostatic attraction. To rotate the mirrors on the beam steering device 304, the required state for each mirror is loaded into a static random-access memory (SRAM) cell that is located beneath each mirror. The SRAM cell is connected to the electrodes that control the rotation of a particular mirror. The charges in the SRAM cells then move each mirror to the desired position. Controller 112, through control signal 182, is configured to provide each SRAM cell with the required charge, and thus, controls the position of each mirror in the beam steering device 304. Based on the position of each mirror, the beam steering device 304 directs the reflected optical waveform 162 to a specific location on the photodetector 312. For example, each scan point 204 in the FOV 106 can have a corresponding known location (e.g., spot) on the photodetector 312 where the beam steering device 304 will direct the reflected optical waveform 162 (e.g., 1 to 1 mapping of scan points to locations on the photodetector that the reflected optical waveforms 162 illuminate).

The optics device 306 (e.g., one or more lenses) directs (e.g., focuses) the reflected optical waveform 162 from the beam steering device 304 to the known location on the photodetector 312. In this way, the receiver front end 122 provides an imaging optical path from the object at the scan point targeted by the transmitter 102, to a specific location on the photodetector 312 providing an instantaneous field of view (iFOV) for the receiver 110 of the scan point targeted. The photodetector 312, in an embodiment, is an array (e.g., a rectangular array) of photodiode elements (e.g., PiN photodiodes, APDs, SPADs, and/or SiPMs).

The photodetector 312 is configured to receive the reflected optical waveform 162 and convert the reflected optical waveform 162 into a current received signal 352 (a current that is proportional to the intensity of the received reflected light). The photodetector 302, which is depicted as a photodiode in FIG. 3, in an embodiment, receives the optical waveform 152, or a portion of the optical waveform 152 directly from the transmitter 102 and converts the optical waveform 152 into a current reference signal 362 (a current that is proportional to the intensity of the received light directly from transmitter 102). In some embodiments, the photodetector 312 is embedded as part of the photodetector 312, while in other embodiments, the photodetector 302 is separate from photodetector 312. The photodetector 302 is comprised of, in some embodiments, one or more PiN photodiodes, APDs, SPADs, and/or SiPMs; however, can be any type of photodetector.

In addition to receiving the reflected optical waveforms 162 from the FOV 106, the receiver frontend 122 also can receive ambient light 372 from an ambient light source 310 from the FOV 106. For example, sunlight reflected off objects that are not located at a desired scan point and/or received directly from the sun can be received by the receiver frontend 122. This ambient light 372 is also received by the beam steering device 304, in some embodiments, after being directed (e.g., focused) by the optics device 322. The beam steering device 304 is configured, in an embodiment, to direct the ambient light 372 away from the photodetector 352. For example, because the controller 112, in an embodiment, causes the transmitter 102 to direct an optical waveform 152 to a specific scan point (e.g., scan point 204c), the controller 112 can position the beam steering device 304 to direct the reflected optical waveform 162 toward the photodetector 312 while directing the ambient light 372 away from the photodetector (e.g., toward an absorber). Thus, the receiver frontend 122 can act as a spatial light filtering system that filters out the ambient light 372 from the light received by the photodetector 312.

Figure 4:
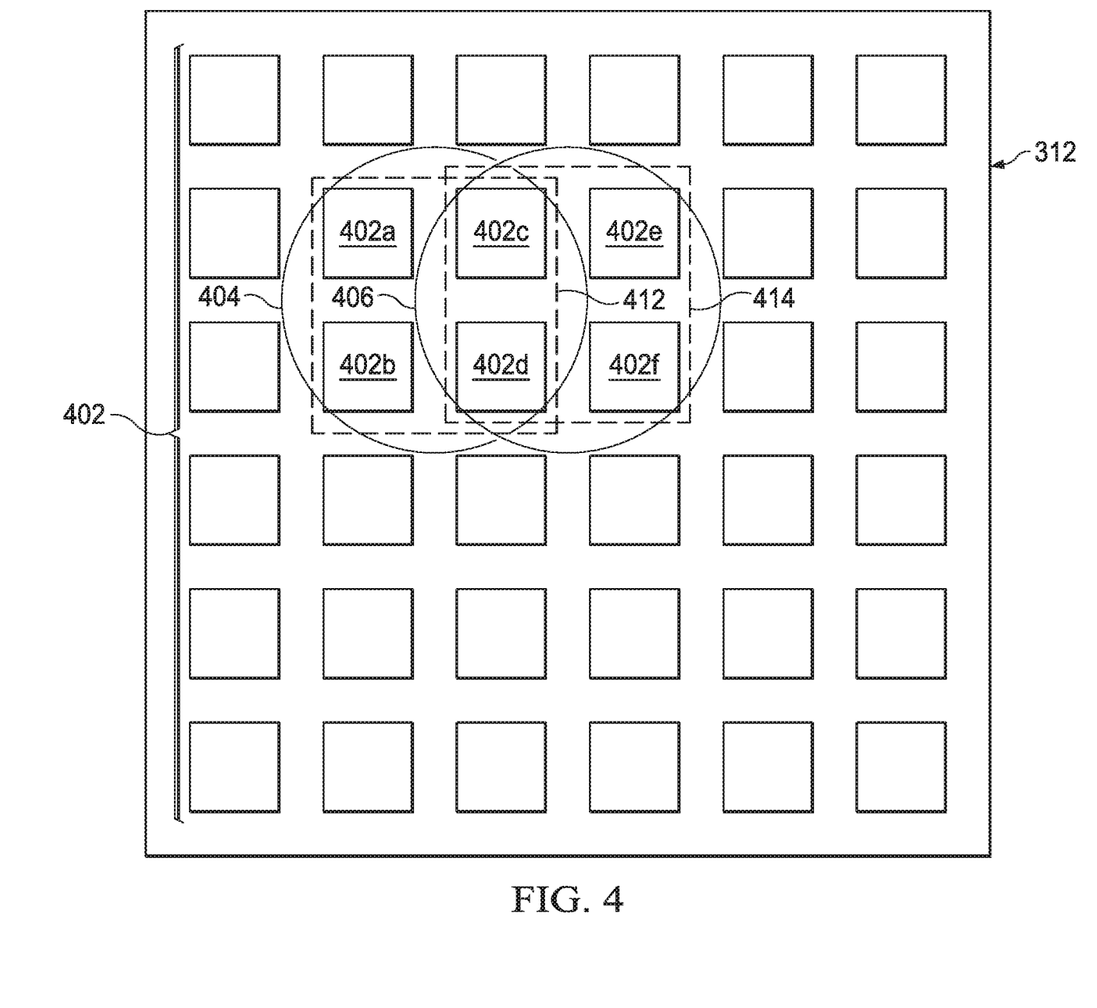
FIG. 4 shows a block diagram of an illustrative photodetector in the receiver frontend for an optical distance measuring system in accordance with various examples.

FIG. 4 shows a block diagram of an illustrative photodetector 312 in the receiver frontend 122 for optical distance measuring system 100 in accordance with various examples. As discussed above, the photodetector 312 includes, in an embodiment, an array of photodiode elements 402. For a given photodetector 312, each of the photodiode elements 402 can be a PiN photodiode, an APD, a SPAD, and/or a SiPM. Thus, each photodiode element 402 can be a single photodiode or an array of photodiodes (e.g., a SiPM). Hence, the array of photodiode elements 402 may include additional arrays of photodiodes.

As discussed above, each reflected optical waveform 162 is directed by the beam steering device 304 to the photodetector 312. For example, the reflected optical waveform 162 reflected off object 206 at scan point 204c, is directed to illuminate the photodetector 312 at the location shown by the circle 404 in FIG. 4. In other words, a spot of light corresponding to the reflected optical waveform 162 is imaged onto the photodetector 312 bounded by circle 404. In some embodiments, for each scan point 204 illuminated by a transmitted optical waveform 152, the beam steering device 304 is configured to illuminate a different portion of the photodetector 312 with a corresponding reflected optical waveform 162. For example, as discussed above, the circle 404 denotes the extent of the light from the reflected optical waveform 162 from a transmission of an optical waveform 152 to scan point 204c. The circle 406 denotes the extent of the light from the reflected optical waveform 162 from a transmission of an optical waveform 152 to scan point 204d. While at two distinct locations on photodetector 312, as shown by the circles 404-406, the reflected optical waveforms 162 may overlap on the photodetector 312. In other words, the extent of light from the reflected optical waveforms 162 transmitted at different scan points in the FOV 106 can overlap on photodetector 312.

Additionally, as shown in FIG. 4, each reflected optical waveform 162 does not illuminate the entire photodetector 312. Therefore, the controller 112 is, in an embodiment, through control signal 182, configured to activate less than all of the photodiode elements 402 while processing each of the reflected optical waveforms 162. More specifically, the controller 112 is configured to activate photodiode elements 402 where the light from the reflected optical waveform 162 falls on the photodetector 312. For example, the light from the reflected optical waveform 162 from a transmission of an optical waveform 152 to scan point 204c falls within the circle 404. Therefore, the controller 112 is configured to activate photodiode elements 402a-d for optical waveform 152 transmissions to scan point 204c. In some embodiments, the remaining photodiode elements are not activated when optical waveform 152 transmissions are made to scan point 204c. Thus, only photodiode elements 402a-d contribute to the current received signal 352 generated by the photodetector 312 for this transmission. The photodiode elements 402a-d make up photodiode group 412. Similarly, the controller 112 is configured to activate photodiode elements 402c-f for optical waveform 152 transmissions to scan point 204d. In some embodiments, the remaining photodiode elements are not activated when optical waveform 152 transmissions are made to scan point 204d. The photodiode elements 402c-f make up photodiode group 414. Because the light from the reflected optical waveforms can overlap when they are directed to photodetector 312, the photodiode groups, in this case photodiode groups 412-414, can share photodiode elements (e.g., photodiode elements 402c-d).

As discussed above, photodiode elements 402 can be grouped together in photodiode groups (e.g., photodiode groups 412-414). For example, photodiode group 412 is a 2 photodiode element by 2 photodiode element group. Photodiode groups can be any size group, including a single photodiode element 402 and/or all photodiode elements 402 in the array. The controller 112 determines, in an embodiment, the photodiode group size based on the extent of the light that falls on the photodetector 312 during each reflected optical waveform 162. For example, the photodiode group size can be large enough to capture all or approximately all of the light for a given transmission on the photodetector 312.

Because the controller 112 can cause the beam steering device 304 to direct the reflected optical waveform 162 to known locations on the photodetector 312 that correspond with the known scan point that the transmitter 102 directs the optical waveform 152, the controller 112, can activate photodiode groups based on a predetermined pattern. For example, the controller 112 may cause the transmitter 102 to transmit an optical waveform 152 toward scan point 204c. The controller 112 causes the beam steering device 304 to direct the reflected optical waveform 162, reflected off object 206 to illuminate the photodetector 312 at the location bounded by circle 404 as the scan point 204c is, in an example, mapped to the circle 404. Thus, the controller 112 causes the photodiode group 412 to activate, while keeping the remaining photodiode elements inactive, to receive the reflected optical waveform 162 reflected off object 206. Similarly, the controller 112 causes the transmitter 102 to direct an optical waveform 152 toward the adjacent scan point 204d. The controller 112 causes the beam steering device 304 to steer the reflected optical waveform 162, reflected off object 208 to illuminate the photodetector 312 at the location bounded by circle 406 as the scan point 204d is, in an example, mapped to the circle 406. Thus, the controller 112 causes the photodiode group 414 (e.g., the adjacent iFOV of the photodiode group 412) to activate, while keeping the remaining photodiode elements inactive, to receive the reflected optical waveform 162 reflected off object 208.

In this way, the thermal noise and capacitance of the photodetector 312 is reduced because the thermal noise and capacitance of only the selected photodiode group contributes to the overall capacitance of the photodetector 312 instead of the entire array of elements as in conventional photodetectors. Furthermore, because the controller 112 activates photodiode elements 402 that cover the area of the photodetector 312 illuminated by the received reflected optical waveform 162, signal-to-noise ratio (SNR) is maximized. For example, if a 3 mm SiPM, which contains an array of SiPMs of approximately 4700 SPADs, is grouped into a 8 SiPM by 8 SiPM array with each SiPM cell containing 64 SPADs, the thermal noise sigma is reduced by a factor of 8 times compared to the thermal noise of the entire SiPM array, thus reducing the thermal noise to a point where it is insignificant compared to ambient shot noise. Furthermore, the capacitance of such a photodetector can be reduced by 2 times resulting in twice the bandwidth or a 19% increase in range because bandwidth increase results in a square root increase in noise sigma and 2 times increase in signal slope. More particularly, the slope of the transmitted optical waveforms 152 corresponds with the distance to an object that can be measured (e.g., the greater the slope of the transmitted signal, the greater the distance that can be measured by that signal). Therefore, because an increase in bandwidth allows an increase in slope of a transmitted signal, the distance that the system can measure increases. In short, by configuring such a photodetector into groups of 8 SiPM by 8 SiPM arrays, distance measurement range of the distance measurement system 100 increases by approximately 19%.

Figure 5:
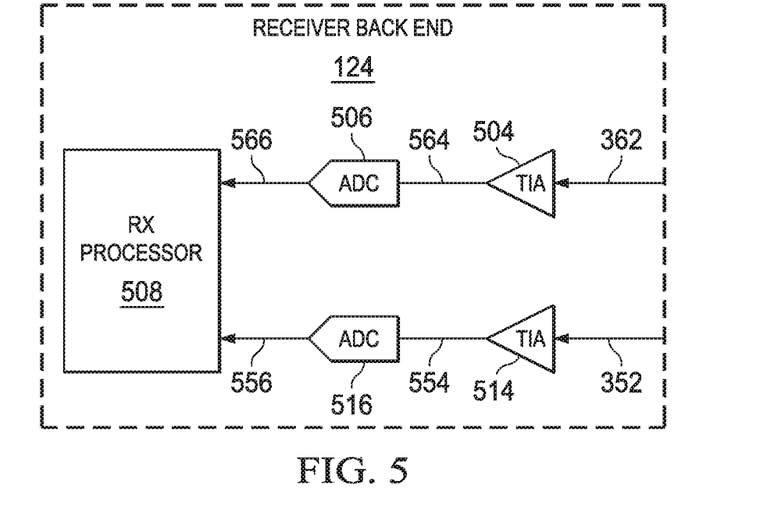
FIG. 5 shows a block diagram of an illustrative receiver backend for an optical distance measuring system in accordance with various examples.

FIG. 5 shows a block diagram of an illustrative receiver backend 124 for optical distance measuring system 100 in accordance with various examples. The receiver backend 124 includes, in an embodiment, two trans-impedance amplifiers (TIAs) 504 and 514, two analog-to-digital converters (ADCs) 506 and 516, and a receiver processor 508. As discussed above, in an embodiment, a reflected optical waveform 162 is received by the receiver frontend 122 after reflecting off of an object within the FOV 106 and converted into a current received signal 352. TIA 514 is configured to receive the current received signal 352 and convert the current received signal 352 into a voltage signal, designated as voltage received signal 554 that corresponds with the current received signal 352. ADC 516 is configured to receive the voltage received signal 554 and convert the voltage received signal 554 from an analog signal into a corresponding digital signal, designated as digital received signal 556. Additionally, in some embodiments, the current received signal 352 is filtered (e.g., band pass filtered) prior to being received by the TIA 514 and/or the voltage received signal 554 is filtered prior to being received by the ADC 516. In some embodiments, the voltage received signal 554 is received by a time to digital converter (TDC) (not shown) to provide a digital representation of the time that the voltage received signal 554 is received.

The receiver frontend 122 also, as discussed above, in an embodiment, receives an optical waveform 152, or a portion of an optical waveform 152, directly from the transmitter 102 and converts the optical waveform 152 into a current reference signal 362. TIA 504 is configured to receive the current reference signal 362 and convert the current reference signal 362 into a voltage signal, designated as voltage reference signal 564 that corresponds with the current reference signal 362. ADC 506 is configured to receive the voltage reference signal 564 and convert the voltage reference signal 564 from an analog signal into a corresponding digital signal, designated as digital reference signal 566. Additionally, in some embodiments, the current reference signal 362 is filtered (e.g., band pass filtered) prior to being received by the TIA 504 and/or the voltage reference signal 564 is filtered prior to being received by the ADC 506. In some embodiments, the voltage reference signal 564 is received by a TDC (not shown) to provide a digital representation of the time that the voltage reference signal 564 is received.

The processor 508 is any type of processor, controller, microcontroller, and/or microprocessor with an architecture optimized for processing the digital received signal 556 and/or the digital reference signal 566. For example, the processor 508 can be a digital signal processor (DSP), a central processing unit (CPU), a reduced instruction set computing (RISC) core such as an advanced RISC machine (ARM) core, a mixed signal processor (MSP), field programmable gate array (FPGA), etc. In some embodiments, the processor 508 is a part of the controller 112. The processor 508, in an embodiment, acts to demodulate the digital received signal 556 and the digital reference signal 566 based on the modulation reference signal generated by the transmitter 102. The processor 508 then determines, in an embodiment, the distance to an object at the scan point (e.g., object 206 at scan point 204c) by, as discussed above, performing a correlation function using the reference signal and the received signal. A peak in the correlation function corresponds to the time delay of each received reflected optical waveform 162 (i.e., the TOF). The distance to the object at the scan point can be estimated using the formula discussed above. In other embodiments, an FFT is performed on the received digital signal 556. A phase of the tone is then used to estimate the delay (i.e., TOF) in the received signals. The distance can then be estimated using the formula discussed above.

Figure 6:
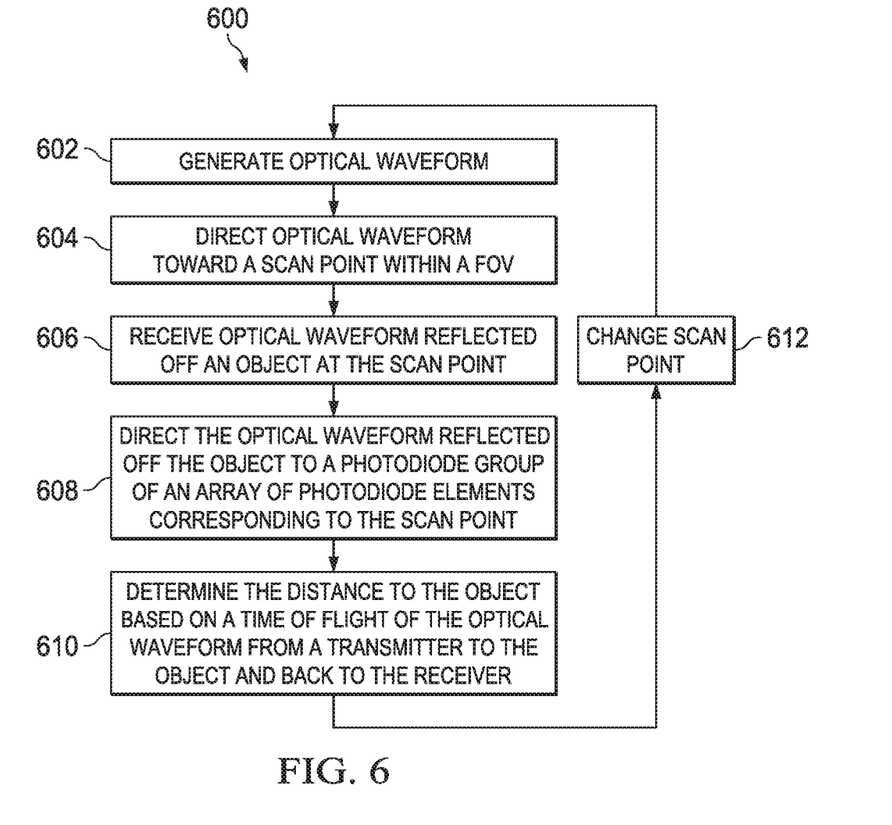
FIG. 6 shows an illustrative flow diagram of a method for determining a distance to one or more objects in accordance with various examples.

FIG. 6 shows an illustrative flow diagram of a method 600 for determining a distance to one or more objects in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, are performed by the transmitter 102, the receiver frontend 122 (including the optics devices 322 and/or 306, the receiver beam steering device 304, and/or the photodiodes 302 and/or 312), the receiver backend 124 (including the TIAs 504 and/or 514, ADCs 506 and/or 516, and/or processor 508), and/or the controller 112 and implemented in logic and/or by a processor executing instructions stored in a non-transitory computer readable storage medium.

The method 600 begins in block 602 with generating an optical waveform. For example, transmitter 102 is configured, in an embodiment, to generate an optical waveform 152 with a laser diode driven by a transmit driver. In block 604, the method 600 continues with directing the optical waveform toward a scan point within a FOV. For example, the transmitter 102 directs, in an embodiment, the optical waveform 152 toward one of the scan points 204 (e.g., scan point 204c) within the scan region 202 of the FOV 106.

The method 600 continues in block 606 with receiving the optical waveform reflected off an object at the scan point. For example, the receiver frontend 122 receives the reflected optical waveform 162 after the optical waveform 152 reflects off an object at the scan point (e.g., object 206 at scan point 204c). In block 608, the method 600 continues with directing the optical waveform reflected off the object to a photodiode group of an array of photodiode elements corresponding to the scan point. For example, the beam steering device 304 directs the reflected optical waveform 162 to a known location on the photodetector 312. More specifically, the beam steering device 304 directs the reflected optical waveform 162 to illuminate specific photodiode elements 402 that make up a photodiode group that corresponds to the scan point at which the transmitter 102 directed the optical waveform 152. Thus, if the transmitter directs the optical waveform toward scan point 204c, the beam steering device 304 directs the reflected optical waveform to illuminate photodiode group 412. In some embodiments, the controller 112 activates only the photodiode elements 402a-d in the photodiode group 412 and keeps the remaining photodiode elements on the photodetector 312 disabled.

The method 600 continues in block 610 with determining the distance to the object based on a TOF of the optical waveform from a transmitter to the object and back to the receiver. For example, in an embodiment, the receiver 110, through the photodetector 312, converts the reflected optical waveform 162 into a received electrical signal, such as received digital signal 656, and determines the TOF of this reflected optical waveform 162 based on a comparison between a reference signal corresponding to the optical waveform 152 received directly from the transmitter 102 with the received electrical signal. The distance is then determined based on the TOF.

In block 612, the method 600 continues with changing the scan point. For example, if the scan point in block 604 is scan point 204c, then the controller 112 changes the scan point from scan point 204c to the adjacent scan point of 204d. The method 600 then continues in block 602 with generating another optical waveform which is then directed, in block 604 toward the new scan point (e.g., scan point 204d).

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An optical distance measuring system, comprising:
   a transmitter configured to generate a first optical waveform and direct the first optical waveform toward a first scan point within a field of view (FOV), and to generate a second optical waveform and direct the second optical waveform toward a second scan point within the FOV;
   an array of photodiode elements, the array including first and second photodiode groups; and
   a receiver coupled to the first and second photodiode groups, the receiver configured to:
      receive the first optical waveform reflected off a first object within the FOV;
      direct the received first optical waveform to the first photodiode group;
      determine a distance to the first object based on a time of flight of the first optical waveform from the transmitter to the first object and back to the receiver;
      receive the second optical waveform reflected off a second object within the FOV;
      direct the received second optical waveform to the second photodiode group; and
      determine a distance to the second object based on a time of flight of the second optical waveform from the transmitter to the second object and back to the receiver.

2. The optical distance measuring system of claim 1, wherein the first photodiode group includes a first photodiode element and a second photodiode element.

3. The optical distance measuring system of claim 2, wherein:
   the second photodiode group includes the first photodiode element and a third diode element;
   the first photodiode group excludes the third photodiode element; and
   the second photodiode group excludes the second photodiode element.

4. The optical distance measuring system of claim 3, wherein the first scan point is adjacent to the second scan point in an array of scan points that form a scan region within the FOV.

5. The optical distance measuring system of claim 1, wherein the receiver is configured to determine which of the photodiode elements of the array of photodiode elements include the first photodiode group based on a location of the first scan point in the FOV.

6. The optical distance measuring system of claim 1, wherein the receiver is configured to activate only photodiode elements in the first photodiode group, the first photodiode group including less than all of the photodiode elements in the array of photodiode elements.

7. The optical distance measuring system of claim 1, wherein the array of photodiode elements includes an array of PiN diodes, an array of avalanche photodiodes (APDs), an array of single photon avalanche diodes (SPADs), or an array of silicon photomultipliers (SiPMs).

8. An optical receiving system for distance measuring, comprising:
   a transmitter configured to direct a first optical waveform toward a first scan point within a field of view (FOV), and to direct a second optical waveform toward a second scan point within the FOV;
   a receiver beam steering device configured to receive the first optical waveform reflected off a first object located at the first scan point, and to receive the second optical waveform reflected off a second object located at the second scan point;

a photodetector coupled to the receiver beam steering device, the photodetector including an array of photodiode elements, the array including first and second photodiode groups, the first photodiode group configured to receive the first optical waveform from the receiver beam steering device, and the second photodiode group configured to receive the second optical waveform from the receiver beam steering device; and a processor configured to determine a distance to the first object based on a time of flight of the first optical waveform from the transmitter to the first object and back to the photodetector, and to determine a distance to the second object based on a time of flight of the second optical waveform from the transmitter to the second object and back to the photodetector.

9. The optical receiving system of claim 8, wherein the receiver beam steering device is a spatial filter configured to prevent ambient light from the FOV against being received by the photodetector.

10. The optical receiving system of claim 8, wherein the receiver beam steering device is a digital micromirror device (DMD).

11. The optical receiving system of claim 8, wherein:
the first photodiode group includes a first photodiode element and a second photodiode element; and
the second photodiode group includes the first photodiode element and a third photodiode element.

12. The optical receiving system of claim 11, wherein:
the first photodiode group excludes the third photodiode element; and
the second photodiode group excludes the second photodiode element.

13. The optical receiving system of claim 12, wherein the first scan point is adjacent to the second scan point in an array of scan points that form a scan region within the FOV.

14. The optical receiving system of claim 8, wherein the first photodiode group includes less than all of the photodiode elements in the array of photodiode elements.

15. A method for determining a distance to an object, the method comprising:
generating a first optical waveform;
directing the first optical waveform toward a first scan point within a field of view (FOV);
receiving, by a receiver, the first optical waveform reflected off a first object within the FOV;
directing the received first optical waveform to a first photodiode group of an array of photodiode elements;
determining a distance to the first object based on a time of flight of the first optical waveform from a transmitter to the first object and back to the receiver;
generating a second optical waveform;
directing the second optical waveform toward a second scan point within the FOV;
receiving, by the receiver, the second optical waveform reflected off a second object within the FOV;
directing the received second optical waveform to a second photodiode group of the array of photodiode elements; and
determining a distance to the second object based on a time of flight of the second optical waveform from the transmitter to the second object and back to the receiver.

16. The method of claim 15, wherein:
the first photodiode group includes a first photodiode element and a second photodiode element; and
the second photodiode group includes the first photodiode element and a third photodiode element that is excluded from the first photodiode group.

17. The method of claim 16, wherein the first scan point is adjacent to the second scan point in an array of scan points that form a scan region within the FOV.

* * * * *